(12) United States Patent
Chou et al.

(10) Patent No.: US 8,980,151 B2
(45) Date of Patent: Mar. 17, 2015

(54) METHOD FOR COMPRESSION MOLDING A DUAL CORE FOR A GOLF BALL

(75) Inventors: Chien-Hsin Chou, Yun-lin Hsien (TW); Chin-Shun Ko, Kaohsiung (TW); Chun-Ting Chiang, Yun-lin Hsien (TW); Chen-Tai Liu, Yun-lin Hsien (TW); Takahisa Ono, Fujisawa (JP)

(73) Assignee: NIKE, Inc., Beaverton, OR (US)

( * ) Notice: Subject to any disclaimer, the term of this patent is extended or adjusted under 35 U.S.C. 154(b) by 360 days.

(21) Appl. No.: 13/311,415

(22) Filed: Dec. 5, 2011

(65) Prior Publication Data

US 2013/0140734 A1    Jun. 6, 2013

(51) Int. Cl.
| | |
|---|---|
| *B29C 43/14* | (2006.01) |
| *B29C 43/18* | (2006.01) |
| *B29C 43/20* | (2006.01) |
| *B29C 65/70* | (2006.01) |
| *B29D 99/00* | (2010.01) |
| *B29K 9/00* | (2006.01) |
| *B29L 31/54* | (2006.01) |
| *A63B 37/00* | (2006.01) |

(52) U.S. Cl.
CPC ............... *B29C 43/146* (2013.01); *B29C 65/70* (2013.01); *B29C 43/18* (2013.01); *B29C 2043/182* (2013.01); *B29C 2043/189* (2013.01); *B29D 99/0042* (2013.01); *B29K 2009/00* (2013.01); *B29L 2031/546* (2013.01); *A63B 37/005* (2013.01); *A63B 37/0076* (2013.01)
USPC ..... 264/248; 264/250; 264/279.1; 264/297.5; 264/347

(58) Field of Classification Search
CPC ........ B29C 43/18; B29C 43/146; B29C 65/70

USPC ....................................................... 264/297.5
See application file for complete search history.

(56) References Cited

U.S. PATENT DOCUMENTS

| | | |
|---|---|---|
| 3,180,040 A | 4/1965 | Ballam |
| 3,819,795 A | 6/1974 | Martin et al. |
| 5,779,562 A | 7/1998 | Melvin et al. |
| 6,096,255 A | 8/2000 | Brown et al. |

(Continued)

OTHER PUBLICATIONS

Bryce, D.M. Plastic Injection Molding, Manufacturing Startup and Management. Dearborn, MI, Society of Manufacturing Engineers, 1999, vol. IV, p. 40.*

(Continued)

*Primary Examiner* — Christina Johnson
*Assistant Examiner* — David Schmerfeld
(74) *Attorney, Agent, or Firm* — Honigman Miller Schwartz and Cohn LLP; Matthew H. Szalach

(57) ABSTRACT

A method and system for compression molding a dual core of a golf ball is disclosed. The method may include a first cycle in which a top mold plate, a middle mold plate, and a bottom mold plate may be used to compression mold concave shells. During the first cycle, the top mold plate and the bottom mold plate may be held at a first temperature $T1$ and the middle mold plate may be held at a second temperature $T2$. During the first cycle, the mold plates may be pressed together with a first pressure $P1$ for a first time $t1$. A second cycle may include compression molding the concave shells about a solid core. During the second cycle, the top mold plate and the bottom mold plate may be held at the first temperature $T1$ and pressed together with a second pressure $P2$ for a second time $t2$.

12 Claims, 7 Drawing Sheets

(56) References Cited

U.S. PATENT DOCUMENTS

| | | |
|---|---|---|
| 6,180,040 B1 | 1/2001 | Ladd et al. |
| 6,290,797 B1 | 9/2001 | Gosetti et al. |
| 6,544,131 B1 | 4/2003 | Sano et al. |
| 6,645,414 B2 | 11/2003 | Reid, Jr. et al. |
| 6,685,580 B2 | 2/2004 | Sullivan |
| 6,723,009 B2 | 4/2004 | Kato |
| 7,226,367 B2 | 6/2007 | Higuchi et al. |
| 7,335,326 B2 * | 2/2008 | Brum ............... 264/248 |
| 7,407,378 B2 | 8/2008 | Brum |
| 2004/0130064 A1 | 7/2004 | Ninomiya et al. |
| 2004/0232577 A1 | 11/2004 | Brum |
| 2006/0022382 A1 | 2/2006 | Fujisawa |
| 2006/0255502 A1 | 11/2006 | Yokota |

OTHER PUBLICATIONS

Thermoset vs. Thermoplastic Materials. RL Hudson. 2011 [retrieved on Aug. 28, 2014]. Retrieved from the Internet: <URL: www.rlhudson.com/publications/techfiles/thermo.htm>.*

International Search Report and Written Opinion mailed Apr. 17, 2013 for PCT Application No. PCT/IB2012/002581.

* cited by examiner

US 8,980,151 B2

METHOD FOR COMPRESSION MOLDING A DUAL CORE FOR A GOLF BALL

BACKGROUND

Embodiments of the present invention relate generally to a system and method for compression molding a dual core for a golf ball.

The game of golf is an increasingly popular sport at both amateur and professional levels. A wide range of technologies related to the manufacture and design of golf balls are known in the art. For instance, a method of manufacturing golf balls involves compression molding cores. When using this method to create a dual core (core having two layers), this method requires multiple steps including changes in temperatures. For example, the method may include cooling molds between molding steps. It would be advantageous to be able to create a dual core in fewer steps including fewer changes in temperature.

SUMMARY

A method and system for compression molding a dual core of a golf ball is disclosed. The method may generally include a first cycle and a second cycle. The first cycle may include compression molding concave shells between a top mold plate and a middle mold plate and compression molding concave shells between the middle mold plate and a bottom mold plate. The concave shells may later form an outer core layer of a dual golf ball core. The first cycle may shape and partially cure the concave shells. During the first cycle, the top mold plate and the bottom mold plate may be held at a first temperature T1 and the middle mold plate may be held at a second temperature T2 that is substantially lower than the first temperature T1. During the first cycle, the mold plates may be pressed together with a first pressure P1 for a first time t1.

The second cycle may complete the curing of the concave shells about a solid core that may later form an inner core layer of the dual core. The second cycle may include placing the solid core between the concave shells, and compression molding the concave shells about the solid core. During the second cycle, the top mold plate and the bottom mold plate may be held at the first temperature T1 and the middle mold plate may be removed from between the top mold plate and the bottom mold plate. During the second cycle, the top mold plate and the bottom mold plate may be pressed together with a second pressure P2 for a second time t2. The second pressure P2 may be substantially higher than the first pressure P1 and the second time t2 may be substantially longer than the first time t1.

In one aspect, the disclosure provides a method including providing a compression molding apparatus having a top mold plate, middle mold plate, and a bottom mold plate. The method may further include placing a first core material between the top mold plate and the middle mold plate and placing a second core material between the middle mold plate and the bottom mold plate while maintaining both the top mold plate and the bottom mold plate at the first temperature T1 and maintaining the middle mold plate at a second temperature T2. The method may include pressing the first core material between the top mold plate and the middle mold plate to form at least one top concave shell and pressing the second core material between the middle mold plate and the bottom mold plate to form at least one bottom concave shell. The method may include placing a solid core between the at least one top concave shell and the at least one bottom concave shell. The method may include pressing the at least one top concave shell and the at least one bottom concave shell together between the top mold plate and the bottom mold plate while maintaining both the top mold plate and the bottom mold plate at the first temperature T1. The second temperature T2 may be about 30° C. to about 70° C. lower than the first temperature T1. The first temperature T1 may range from about 125° C. to about 195° C. The first temperature T1 may range from about 140° C. to about 180° C. The second temperature T2 may range from about 70° C. to about 130° C. The second temperature T2 may range from about 85° C. to about 115° C. The first core material and the second core material may both include a diene containing composition.

In another aspect, the disclosure provides a method including providing a compression molding apparatus having a top mold plate, middle mold plate, and a bottom mold plate. The method may further include placing a first core material between the top mold plate and the middle mold plate. The method may include placing a second core material between the middle mold plate and the bottom mold plate. The method may include pressing the first core material between the top mold plate and the middle mold plate with a first pressure P1 to form at least one top concave shell. The method may include pressing the second core material between the middle mold plate and the bottom mold plate with a first pressure P1 to form at least one bottom concave shell. The method may include placing a solid core between the at least one top concave shell and the at least one bottom concave shell. The method may include pressing the at least one top concave shell and the at least one bottom concave shell together between the top mold plate and the bottom mold plate at a second pressure P2, wherein the second pressure P2 is substantially greater than the first pressure P1. The first pressure P1 may range from about 85 kg/cm² to about 115 kg/cm². The first pressure P1 may range from about 95 kg/cm² to about 105 kg/cm². The second pressure P2 may range from about 130 kg/cm² to about 170 kg/cm². The second pressure P2 may range from about 145 kg/cm² to about 155 kg/cm².

The step of pressing the first core material between the top mold plate and the middle mold plate to form at least one top concave shell may further include maintaining both the top mold plate and the bottom mold plate at the first temperature T1. The step of pressing the second core material between the middle mold plate and the bottom mold plate to form at least one bottom concave shell may further include maintaining both the top mold plate and the bottom mold plate at the first temperature T1. The step of pressing the at least one top concave shell and the at least one bottom concave shell together between the top mold plate and the bottom mold plate may further include maintaining both the top mold plate and the bottom mold plate at the first temperature T1. The top mold plate may include at least one concave mold chamber, the middle mold plate may include at least one top protrusion and at least one bottom protrusion opposite the at least one top protrusion, and the bottom mold plate may include at least one concave mold chamber. The step of placing a first core material between the top mold plate and the middle mold plate may include placing the first core material on the at least one top protrusion. The step of placing a second core material between the middle mold plate and the bottom mold plate may include placing the second core material within the at least one concave mold chamber of the bottom mold plate.

In another aspect, the disclosure provides a method including providing a compression molding apparatus having a top mold plate, middle mold plate, and a bottom mold plate. The method may include heating both the top mold plate and the bottom mold plate. The method may include heating the middle mold plate. The method may include placing a first core material between the top mold plate and the middle mold plate. The method may include placing a second core material between the middle mold plate and the bottom mold plate. The method may include pressing the first core material between the top mold plate and the middle mold plate for a first time t1 to form at least one top concave shell. The method may include pressing the second core material between the middle mold plate and the bottom mold plate for a first time t1 to form at least one bottom concave shell. The method may include placing a solid core between the at least one top concave shell and the at least one bottom concave shell. The method may include pressing the at least one top concave shell and the at least one bottom concave shell together between the top mold plate and the bottom mold plate for a second time t2. The second time t2 may be at least 5 times greater than the first time t1. The first time t1 may range from about 30 seconds to about 90 seconds. The second time t2 may range from about 400 seconds to about 550 seconds.

The step of pressing the first core material between the top mold plate and the middle mold plate to form at least one top concave shell may include maintaining both the top mold plate and the bottom mold plate at the first temperature T1. The step of pressing the second core material between the middle mold plate and the bottom mold plate to form at least one bottom concave shell may include maintaining both the top mold plate and the bottom mold plate at the first temperature T1. The step of pressing the at least one top concave shell and the at least one bottom concave shell together between the top mold plate and the bottom mold plate may include maintaining both the top mold plate and the bottom mold plate at the first temperature T1.

The step of pressing the first core material between the top mold plate and the middle mold plate to form at least one top concave shell may include pressing the first core material between the top mold plate and the middle mold plate with a first pressure P1. The step of pressing the second core material between the middle mold plate and the bottom mold plate to form at least one bottom concave shell may further include pressing the second core material between the middle mold plate and the bottom mold plate with a first pressure P1. The step of pressing the at least one top concave shell and the at least one bottom concave shell together between the top mold plate and the bottom mold plate may further include pressing the at least one top concave shell and the at least one bottom concave shell together with a second pressure P2, wherein the second pressure P2 is substantially greater than the first pressure P1.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
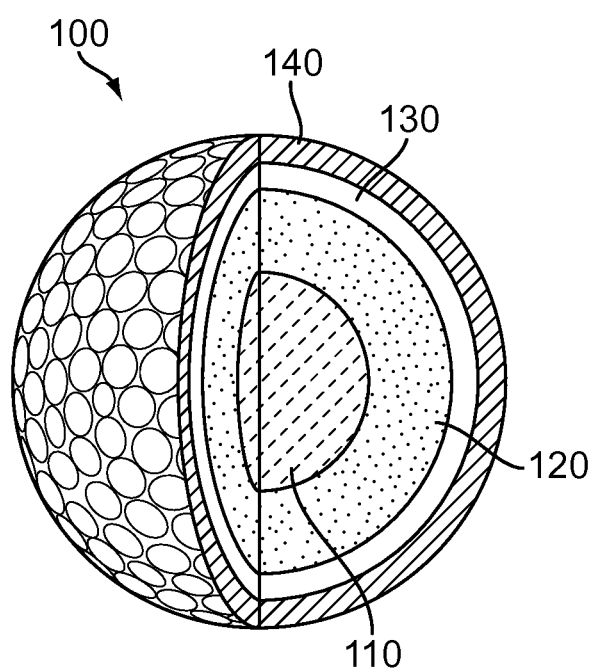
FIG. 1 shows an exemplary ball having a dual core formed by the disclosed method.

FIG. 1 shows an exemplary golf ball 100 having a core formed by the exemplary method described with respect to FIGS. 2-8. Golf ball 100 may include an outer cover layer 140 and an inner cover layer 130. Golf ball 100 may further include a dual core having an outer core layer 120 and an inner core layer 110.

In some embodiments, outer core layer 120 may have a thickness ranging from about 1 mm to about 12 mm. In some embodiments, outer core layer 120 may have a thickness ranging from about 3 mm to about 10 mm. In some embodiments, outer core layer 120 may have a thickness ranging from about 4 mm to about 7 mm.

In some embodiments, inner core layer 110 may have a diameter ranging from about 12 mm to about 32 mm. In some embodiments, inner core layer 110 may have a diameter ranging from about 19 mm to about 30 mm. In some embodiments, inner core layer 110 may have a diameter ranging from about 21 mm to about 28 mm.

The core material used to make outer core layer 120 may include any suitable type of core material. For example, in some embodiments, the core material may include a diene containing composition, such as polybutadiene. In some embodiments, the diene containing composition may include a co-crosslinking agent, an organic peroxide, and/or a filler. The type of core material used to make outer core layer 120 may be selected based upon a variety of factors. For example, the outer core material may be selected based upon the desired coefficient of restitution and/or the desired specific gravity of the outer core layer.

In some embodiments, a polybutadiene having a proportion of cis-1,4 bonds of equal to or greater than 60 mol % may be used as the outer core material. In some embodiments, the polybutadiene may have a proportion of cis-1,4 bonds of equal to or greater than 80 mol %. In some embodiments, a polybutadiene synthesized using a rare earth element catalyst may be used in the outer core to achieve excellent resilience performance of a golf ball. Examples of rare earth element catalysts may include lanthanum series rare earth element compound, organoaluminum compound, and almoxane and halogen containing compound.

In some embodiments, a co-crosslinking agent including zinc diacrylate, magnesium acrylate, zinc methacrylate, or magnesium methacrylate may be provided in the outer core material. In some embodiments, zinc diacrylate may provide advantageous resilience properties.

In some embodiments, an organic peroxide including dicumyl peroxide, 1,1-bis(t-butylperoxy)-3,3,5-trimethylcyclohexane, 2,5-dimethyl-2,5-di(t-butylperoxy)hexane, or di-t-butyl peroxide may be provided in the outer core material. In some embodiments, the organic peroxide may contribute about 0.2 to about 5 parts by weight, based on 100 parts by weight of the polybutadiene. In some embodiments, the organic peroxide may contribute about 0.5 to about 3 parts by weight, based on 100 parts by weight of the polybutadiene.

In some embodiments, a filler may be provided in the outer core material. The filler may be used to increase the specific gravity of the material. The filler may include zinc oxide, barium sulfate, calcium carbonate, or magnesium carbonate. Metal powder, such as tungsten, may alternatively be used as a filler to achieve a desired specific gravity. In some embodiments, the specific gravity of the outer core layer may be from about 1.05 g/cm$^3$ to about 1.45 g/cm$^3$. In some embodiments, the specific gravity of the outer core layer may be from about 1.05 g/cm$^3$ to about 1.35 g/cm$^3$.

The core material used to make inner core layer 110 may include any suitable type of core material. For example, in some embodiments, inner core layer 110 may be formed primarily of a thermoset material, such as polyurethane elastomers, polyamide elastomers, polyurea elastomers, a diene-containing composition, crosslinked metallocene catalyzed polyolefin, silicone, and combinations thereof. In some embodiments, inner core layer 110 may be formed primarily of a thermoplastic material, such as an ionomer resin, a highly neutralized acid polymer composition, a polyamide resin, a polyester resin, a polyurethane resin, and combinations thereof. The type of core material used to make inner core layer 110 may be selected based upon a variety of factors. For example, the inner core material may be selected based upon the desired coefficient of restitution and/or the desired specific gravity of the inner core layer.

In some embodiments, the core material used to make inner core layer 110 may include at least two highly neutralized acid polymer compositions. In some embodiments, the at least two highly neutralized acid polymer compositions may be dry blended or compounded in an extruder. In some embodiments, the inner core layer may include a blend of a first highly neutralized acid polymer composition with a low flexural modulus and a second highly neutralized acid polymer composition with a low flexural modulus. Examples of highly neutralized acid polymer compositions with a low flexural modulus include HPF resins such as HPF1000, HPF2000, HPF AD1035, and HPF AD1040, all produced by E.I. Dupont de Nemours and Company. The first and second highly neutralized acid polymer may have a flexural modulus ranging from about 1,000 psi to about 45,000 psi. In some embodiments, the first and second highly neutralized acid polymer may have a flexural modulus ranging from about 1,000 psi to about 40,000 psi. In the other embodiments, the first and second highly neutralized acid polymer may have a flexural modulus ranging from about 1,000 psi to about 35,000 psi.

In some embodiments, the ratio of the first highly neutralized acid polymer composition to the second highly neutralized acid polymer composition may range from 20:80 to 80:20. In other embodiments, the ratio of the first highly neutralized acid polymer composition to the second highly neutralized acid polymer composition may range from 40:60 to 60:40. In some embodiments, the highly neutralized acid polymers may be made by neutralizing an acid to 80% or higher, including up to 100%, with a cation source, such as magnesium, sodium, zinc, or potassium. Inner core layer 110 may optionally include additives, fillers, and/or melt flow modifiers. Suitable additives and fillers may include, for example, blowing and foaming agents, optical brighteners, coloring agents, fluorescent agents, whitening agents, UV absorbers, light stabilizers, defoaming agents, processing aids, mica, talc, nanofillers, antioxidants, stabilizers, softening agents, fragrance components, plasticizers, impact modifiers, acid copolymer wax, surfactants. Suitable fillers may also include inorganic fillers, such as zinc oxide, titanium dioxide, tin oxide, calcium oxide, magnesium oxide, barium sulfate, zinc sulfate, calcium carbonate, zinc carbonate, barium carbonate, mica, talc, clay, silica, lead silicate. Suitable fillers may also include high specific gravity metal powder fillers, such as tungsten powder and molybdenum powder. Suitable melt flow modifiers may include, for example, fatty acids and salts thereof, polyamides, polyesters, polyacrylates, polyurethanes, polyethers, polyureas, polyhydric alcohols, and combinations thereof.

Figure 2:
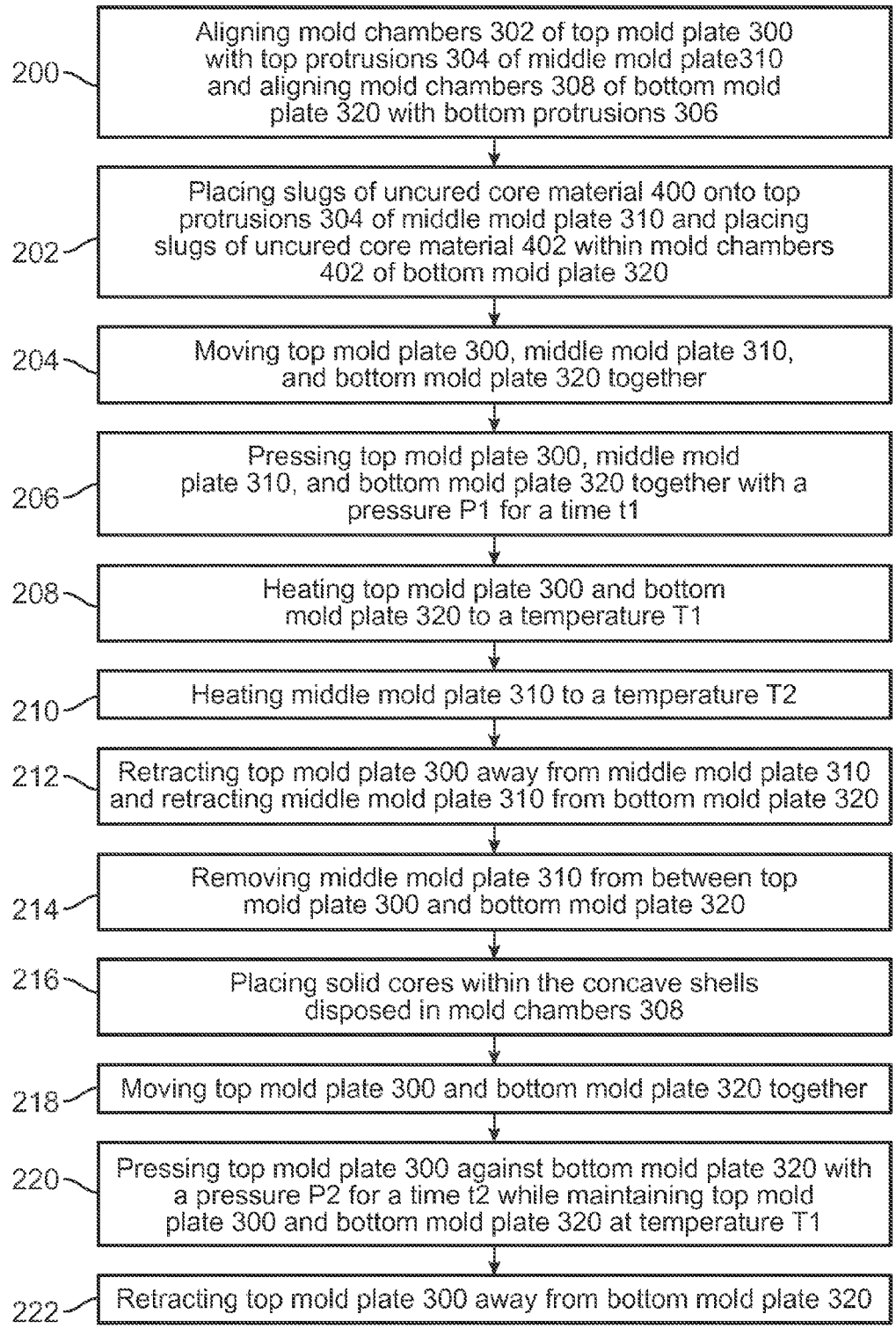
FIG. 2 shows the steps of an exemplary embodiment of the method.

FIGS. 2-9 disclose an exemplary method of forming a dual core. FIG. 2 provides exemplary steps and FIGS. 3-9 illustrate the exemplary steps in progress. In some embodiments, the steps of the exemplary method may be performed in the order in which they are presented. In other embodiments, the steps of the exemplary method may occur in any desired order. A compression molding apparatus may be used to carry out the method.

Figure 3:
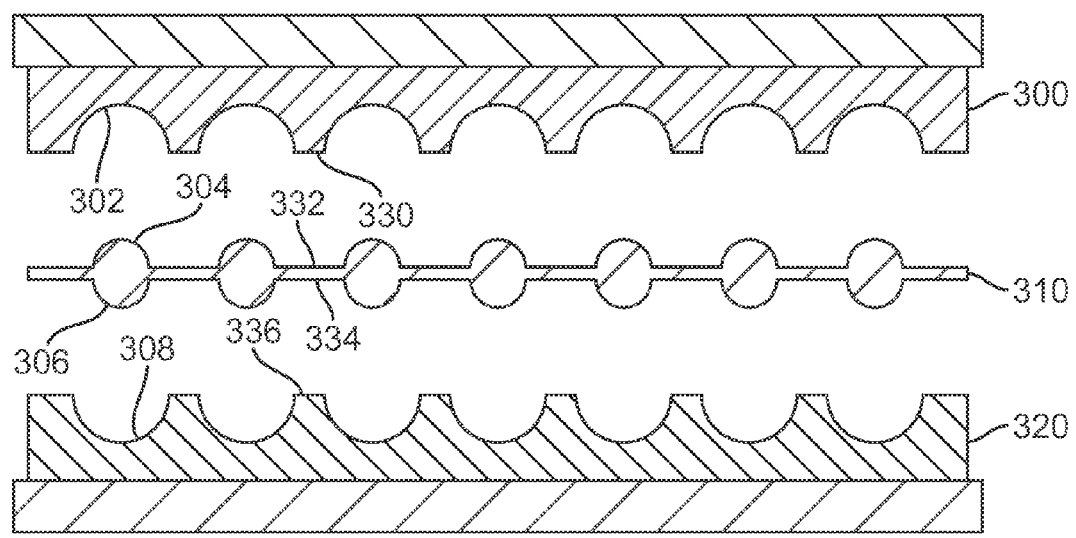
FIG. 3 shows an exemplary compression molding apparatus used to perform an exemplary method of FIG. 2.

FIG. 3 shows an exemplary compression molding apparatus including a top mold plate 300, a bottom mold plate 320, and a middle mold plate 310 disposed between top mold plate 300 and bottom mold plate 320. Top mold plate 300 may include a flat surface 330 in which mold chambers 302 are formed. As shown in FIG. 3, top mold plate 300 may include multiple mold chambers 302. In other embodiments, top mold plate 300 may include a single mold chamber. Mold chambers 302 may be concave. Mold chambers 302 may be hemispherical in shape. In some embodiments, mold chambers 302 may include other shapes. The shape of mold chambers 302 may be selected based on a variety of factors. For example, the shape of mold chambers 302 may be selected based on the desired shape of outer core layer 120 or the shape of the cover layers. Bottom mold plate 320 may be identical to top mold plate 300 and/or bottom mold plate 320 may be a mirror image of top mold plate 300. Bottom mold plate 320 may include a flat surface 336 in which mold chambers 308 are formed. As shown in FIG. 3, bottom mold plate 320 may include multiple mold chambers 308. In other embodiments, bottom mold plate 320 may include a single mold chamber. Mold chambers 308 may be concave. Mold chambers 308 may be hemispherical in shape. In some embodiments, mold chambers 308 may include other shapes. The shape of mold chambers 308 may be selected based on a variety of factors. For example, the shape of mold chambers 308 may be selected based on the desired shape of outer core layer 120 or the shape of the cover layers. Mold chambers 302 and mold chambers 308 may be configured to be aligned with one another when top mold plate 300 is placed over bottom mold plate 320 such that mold chambers 302 facing mold chambers 308.

Middle mold plate 310 may be configured to be placed between top mold plate 300 and bottom mold plate 320. Middle mold plate 310 may include a first flat surface 332 from which top protrusions 304 extend and a second flat surface 334 from which bottom protrusions 306 extend. As shown in FIG. 3, top protrusions 304 and bottom protrusions 306 may extend in opposite directions from each other. As shown in FIG. 3, middle mold plate 310 may include multiple top protrusions 304 and multiple bottom protrusions 306. In other embodiments, middle mold plate 310 may include a single top protrusion and a single bottom protrusion. In some embodiments, top protrusions 304 and bottom protrusions 306 may be hemispherical in shape. In some embodiments, top protrusions 304 and bottom protrusions 306 may include other shapes. The shape of top protrusions 304 and bottom protrusions 306 may be selected based on a variety of factors. For example, the shape of top protrusions 304 and bottom protrusions 306 may be selected based on the desired shape of outer core 120 or the desired shape of inner core layer 110. Top protrusions 304 may be configured to align with mold chambers 302 when middle mold plate 310 is placed underneath top mold plate 300 such that mold chambers 302 face top protrusions 304. Bottom protrusions 306 may be configured to align with mold chambers 308 when middle mold plate 310 is placed above bottom mold plate 320 such that mold chambers 308 face bottom protrusions 306.

Top protrusions 304 may be configured to be inserted within mold chambers 302, and mold chambers 302 may be configured to receive top protrusions 304. Bottom protrusions 306 may be configured to be inserted within mold chambers 308, and mold chambers 308 may be configured to receive bottom protrusions 306.

Top mold plate 300, middle mold plate 310, and bottom mold plate 320 may be configured to be heated. Top mold plate 300, middle mold plate 310, and bottom mold plate 320 may be configured to be pressed together such that top protrusions 304 are inserted into mold chambers 302 and bottom protrusions 306 are inserted into mold chambers 308.

FIG. 3 shows step 200 in progress. As shown in FIG. 2, step 200 may include aligning mold chambers 302 of top mold plate 300 with top protrusions 304 of middle mold plate 310 and aligning mold chambers 308 of bottom mold plate 320 with bottom protrusions 306. FIG. 3 illustrates how the mold plates may be aligned with one another and in a spaced apart position during step 200. The mold plates may be aligned such that mold chambers 302 are aligned with top protrusions 304 and bottom protrusions 306 are aligned with mold chambers 308.

Figure 4:
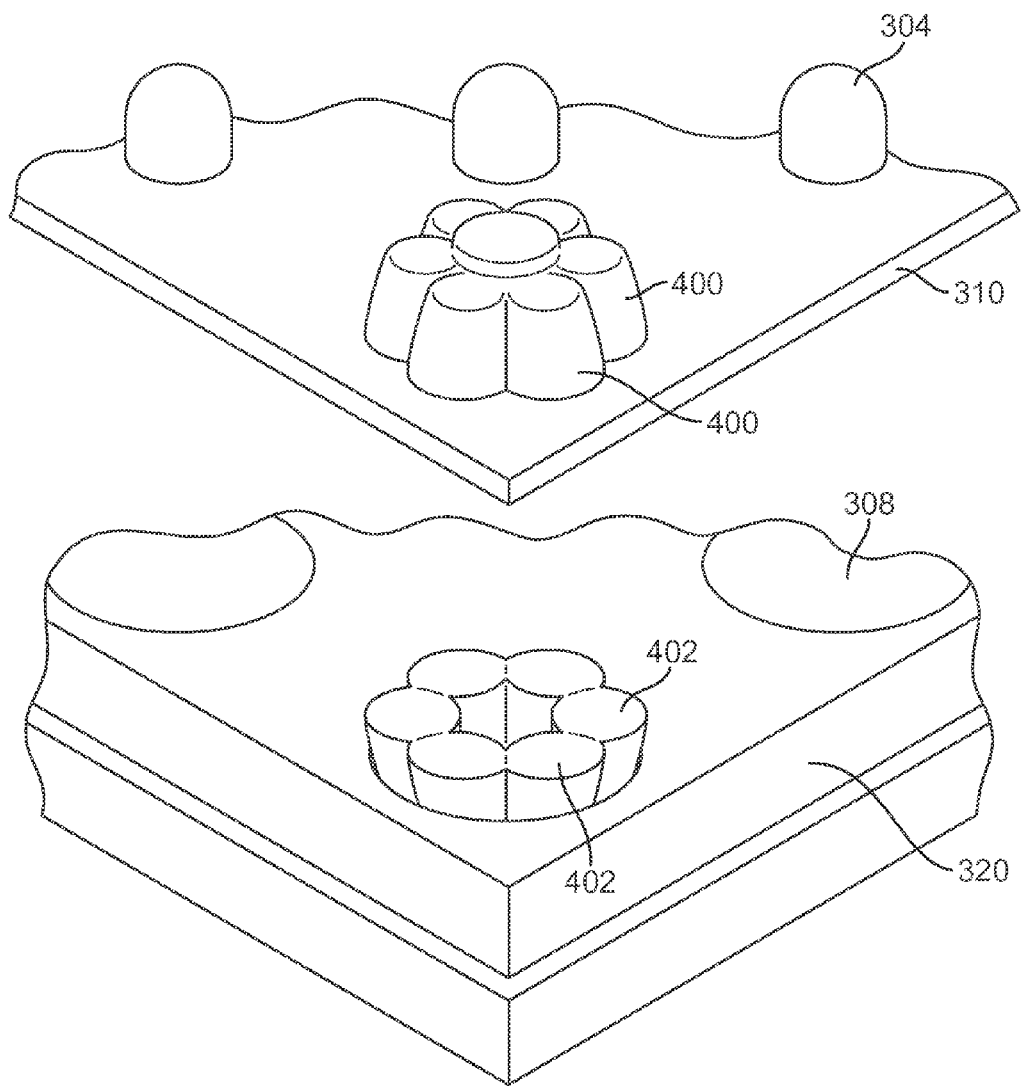
FIG. 4 shows slugs of core material placed upon components of the compression molding apparatus.
Figure 5:
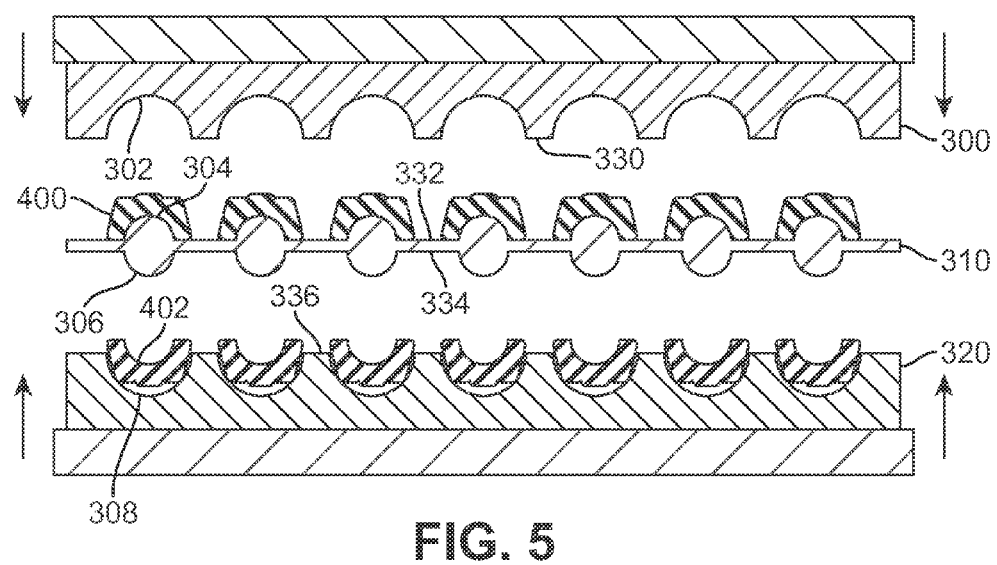
FIG. 5 shows the slugs from FIG. 4 and the components of the compression molding apparatus from another view.

FIGS. 4 and 5 show step 202 in progress. Step 202 may include placing slugs of uncured core material 400 onto top protrusions 304 of middle mold plate 310 and placing slugs of uncured core material 402 within mold chambers 402 of bottom mold plate 320. Slugs 400 may be placed on some or all of top protrusions 304 and within some or all of mold chambers 308, depending upon the number of dual cores to be made. Slugs 400 may be placed on top protrusions 304 and within mold chambers 308 by any method known in the art. For example, uncured core material may be extruded into slugs 400 and 402 and placed on top of protrusions 304 and within mold chambers 308 by tools or hand. As shown in the exemplary embodiment of FIG. 4, slugs 400 and slugs 402 may be flower-shaped. In other embodiments, slugs 400 and 402 may have different shapes. For example, in some embodiments, slugs 400 and 402 may be arc-shaped, hemispherical or cubic. The formation of the slugs may be selected based upon a variety of factors. For example, the formation of the slugs may be selected based upon the type of core material used, the desired distribution of core material within the mold chambers during compression molding, and/or the desired thickness of outer core layer 120. In some embodiments, slugs of uncured core material may be placed within mold chambers 302 in place of in addition to being placed on top of top protrusions 304. In some embodiments, slugs of uncured core material may be placed about bottom protrusions 306 in place of or in addition to being placed within mold chambers 302.

Step 204 may include moving top mold plate 300, middle mold plate 310, and bottom mold plate 320 together. In some embodiments, only middle mold plate 310 and bottom mold plate 320 may be moved towards top mold plate 300 during step 204. In some embodiments, top mold plate 300 and bottom mold plate 320 may be moved in the direction indicated by the arrows in FIG. 5 during step 204. In some embodiments, top mold plate 300 and middle mold plate 310 may be moved together such that slugs 400 contact mold chambers 302 and bottom protrusions 306 contact slugs 402.

Figure 6:
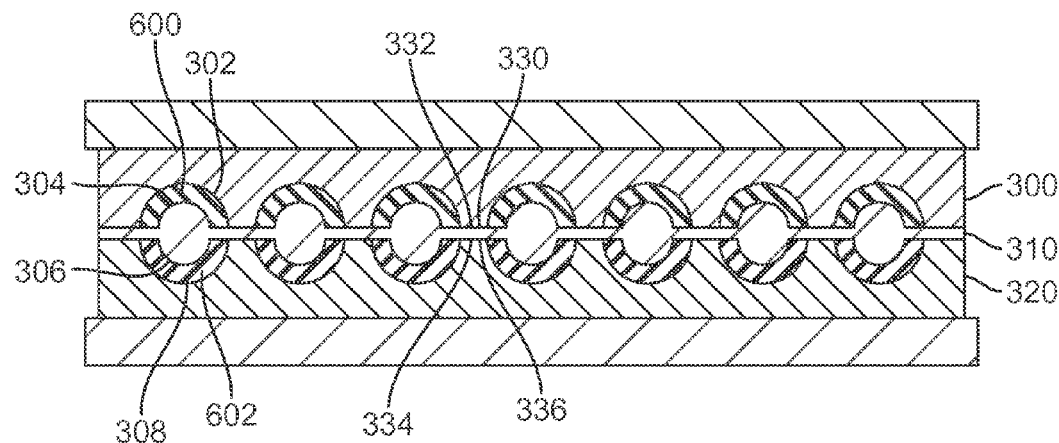
FIG. 6 shows the top mold plate, the middle mold plate, and the bottom mold plate of the compression molding apparatus pressed together.

FIG. 6 illustrates step 206, step 208, and step 210 in progress. In some embodiments, step 206 may include pressing top mold plate 300, middle mold plate 310, and bottom mold plate 320 together with a first pressure P1 for a first time t1. FIG. 6 illustrates the mold plates pressed together. In some embodiments, the pressure may cause flat surface 330 of top mold plate 300 to contact first flat surface 332 of middle mold plate 310. In some embodiments, the pressure may cause flat surface 336 of bottom mold plate 320 to contact second flat surface 334 of middle mold plate 310. As top mold plate 300, middle mold plate 310, and bottom mold plate 320 are pressed together, slugs 400 may be compressed between top protrusions 304 and mold chambers 302. Similarly, slugs 402 may be compressed between bottom protrusions 306 and mold chambers 308. The compression between top protrusions 304 and mold chambers 302 may transform slugs 400 into concave shells 600. The compression between bottom protrusions 306 and mold chambers 308 may transform slugs 402 into concave shells 602. In some embodiments, first pressure P1 may range from about 85 kg/cm$^2$ to about 115 kg/cm$^2$. In some embodiments, first pressure P1 may range from about 95 kg/cm$^2$ to about 105 kg/cm$^2$. In some embodiments, first time t1 may range from about 15 seconds to about 105 seconds. In some embodiments, first time t1 may range from about 30 seconds to about 90 seconds. In some embodiments, first time t1 may range from about 45 seconds to about 75 seconds.

Step 208 may include heating top mold plate 300 and bottom mold plate 320 to a first temperature T1. Step 210 may include heating middle mold plate 310 to a second temperature T2. The application of heat and pressure to concave shells 600 and concave shells 602 may partially cure the concave shells. In some embodiments, T1 may be higher than T2 to reduce the risk of overcuring the outer core layer.

In some embodiments, first temperature T1 may range from about 125° C. to about 195° C. In some embodiments, first temperature T1 may range from about 140° C. to about 180° C. In some embodiments, first temperature T1 may range from about 145° C. to about 170° C. In some embodiments, second temperature T2 may range from about 70° C. to about 130° C. In some embodiments, second temperature T2 may range from about 85° C. to about 115° C. In some embodiments, second temperature T2 may range from about 90° C. to about 110° C.

In some embodiments, step 206 may be performed simultaneously with step 208 and step 210. In some embodiments, step 208 and step 210 may be performed before step 206. In some embodiments, step 206, step 208, and step 210 may be considered a first cycle of the method. This first cycle may be performed within first time t1.

Figure 7:
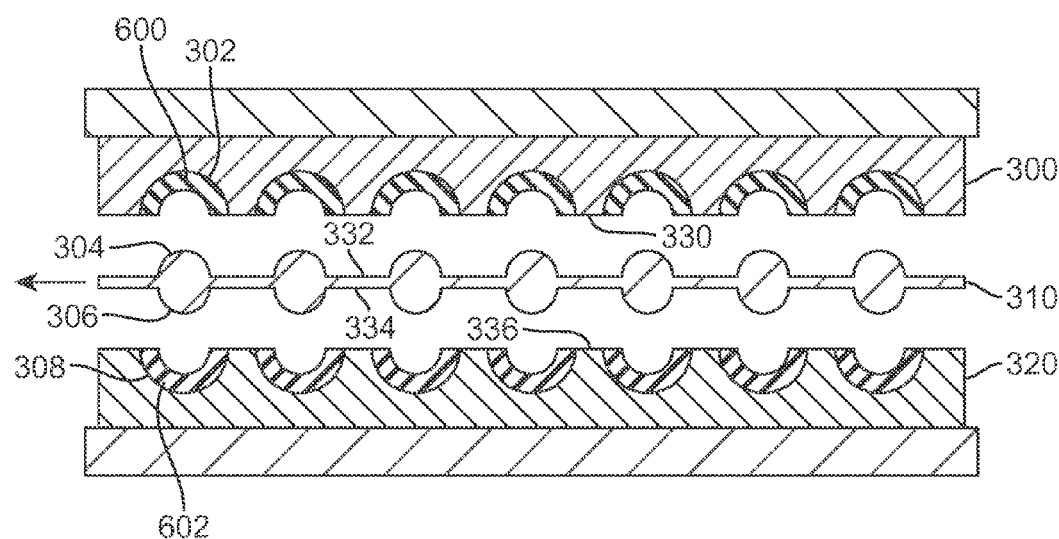
FIG. 7 shows the top mold plate, the middle mold plate, and the bottom mold plate spaced apart.

FIG. 7 shows step 212 and step 214 in progress. Step 212 may include retracting top mold plate 300 away from middle mold plate 310 and retracting middle mold plate 310 from bottom mold plate 320. In some embodiments, step 214 may include removing middle mold plate 310 from between top mold plate 300 and bottom mold plate 320. For example, middle mold plate 310 may be removed in the direction indicated by the arrow shown in FIG. 7.

Figure 8:
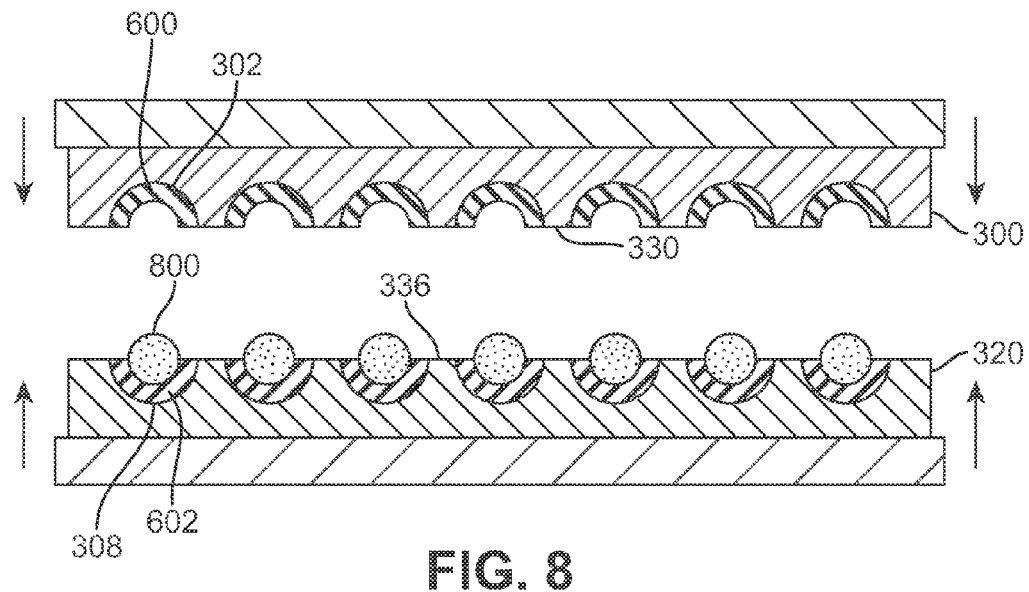
FIG. 8 shows the top mold plate and the bottom mold plate being moved toward one another.

FIG. 8 illustrates step 216 and step 218 in progress. In some embodiments, step 216 may include placing solid cores 800 within the concave shells disposed in mold chambers 308. In some embodiments, solid cores 800 may be spherical in shape. In some embodiments, solid cores 800 may include other shapes. The shape of solid cores 800 may be selected based on a variety of factors. For example, the shape of solid cores 800 may be selected based on the desired shape of outer core layer 120 or the shape of the cover layers. In some embodiments, solid cores 800 may be formed prior to step 214. In some embodiments, solid cores 800 may be formed through injection molding or compression molding. In some embodiments, solid cores 800 may be cooled before performing step 214. For example, in some embodiments, solid cores 800 may be cooled to ambient temperature or below. Cooling solid cores 800 may help stabilize the size and hardness of the solid cores. Also, it is contemplated that certain properties of the solid cores may be measured before performing step 214 to ensure that the solid cores are suitable. For example, the coefficient of restitution of the solid cores may be measured.

Step 218 may include moving top mold plate 300 and bottom mold plate 320 together. In some embodiments, only bottom mold plate 320 may be moved towards top mold plate 300 during step 218. In some embodiments, top mold plate 300 and bottom mold plate 320 may be moved in the direction indicated by the arrows in FIG. 8 during step 218. In some embodiments, top mold plate 300 and bottom mold plate 320 may be moved together such that flat surface 330 of top mold plate 300 contacts flat surface 332 of bottom mold plate 320.

Figure 9:
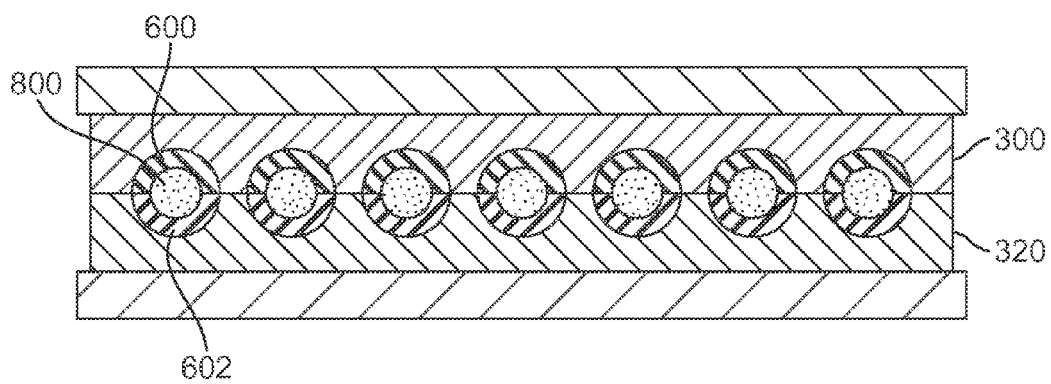
FIG. 9 shows the top mold plate and the bottom mold plate being pressed together.

FIG. 9 illustrates step 220 in progress. In some embodiments, step 220 may include pressing top mold plate 300 against bottom mold plate 320 with a second pressure P2 for a second time t2 while maintaining top mold plate 300 and bottom mold plate 320 at first temperature T1. FIG. 9 illustrates the mold plates pressed together. In some embodiments, second pressure P2 may be substantially higher than first pressure P1. In some embodiments, second pressure P2 may range from about 130 kg/cm² to about 170 kg/cm². In some embodiments, second pressure P2 may range from about 145 kg/cm² to about 155 kg/cm². In some embodiments, second time t2 may range from about 350 seconds to about 600 seconds. In some embodiments, second time t2 may range from about 400 seconds to about 550 seconds. In some embodiments, second time t2 may range from about 425 seconds to about 525 seconds. The application of heat and pressure to concave shells 600 and concave shells 602 may cure the concave shells and join the concave shells together to form outer core layer 120 encasing inner core layer 110. In some embodiments, the ratio of second time t2 to first time t1 may be at least 5. In some embodiments, step 220 may be considered a second cycle of the method. This second cycle may be performed within second time t2. In some embodiments, the concave shells may be partially cured during the first cycle and the concave shells may be cured together about the inner core layer during the second cycle.

Step 222 may include retracting top mold plate 300 away from bottom mold plate 320. The cured dual cores resulting from the exemplary method may be removed and assembled into golf balls. For example, to form golf ball 100 shown in FIG. 1, outer cover layer 140 and inner cover layer 130 may be applied to the dual core. In some embodiments, the cured dual cores may be tested to ensure that the dual cores have suitable properties before assembling the dual cores into golf balls.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

What is claimed is:

1. A method of making a golf ball core consisting of the following steps:
providing a compression molding apparatus having a top mold plate, middle mold plate, and a bottom mold plate;
placing a first core material comprising an uncured diene-containing composition between the top mold plate and the middle mold plate and placing a second core material comprising an uncured diene-containing composition between the middle mold plate and the bottom mold plate while maintaining both the top mold plate and the bottom mold plate at a first temperature T1 and maintaining the middle mold plate at a second temperature T2 that is lower than first temperature T1;
in a first pressing step, pressing for a first time t1 the first core material between the top mold plate and the middle mold plate to form at least one top concave shell and the second core material between the middle mold plate and the bottom mold plate to form at least one bottom concave shell, wherein T1, T2, and t1 are selected such that the diene-containing composition of the at least one top concave shell and the diene-containing composition of the at least one bottom concave shell are partially cured;
removing the middle plate from between the top mold plate and the bottom mold plate;
placing a solid core between the at least one top concave shell and the at least one bottom concave shell; and
in a second pressing step, pressing for a second time t2 the at least one top concave shell and the at least one bottom concave shell together between the top mold plate and the bottom mold plate while maintaining both the top mold plate and the bottom mold plate at the first temperature T1, wherein t2 is selected such that the diene-containing composition of the at least one top concave shell and the diene-containing composition of the at least one bottom concave shell are cured together and wherein t2 is longer than t1.

2. The method according to claim 1, wherein the second temperature T2 is about 30° C. to about 70° C. lower than the first temperature T1.

3. The method according to claim 1, wherein the first temperature T1 ranges from about 125° C. to about 195° C.

4. The method according to claim 3, wherein the first temperature T1 ranges from about 140° C. to about 180° C.

5. The method according to claim 3, wherein the second temperature T2 ranges from about 70° C. to about 130° C.

6. The method according to claim 5, wherein the second temperature T2 ranges from about 85° C. to about 115° C.

7. The method according to claim 1, wherein the solid core is formed of a thermoset material or a thermoplastic material.

8. A method of making a golf ball core according to claim 1, wherein pressing in the first pressing step is carried out at-a first pressure P1 of 85 kg/cm² to about 115 kg/cm²; and-pressing in the second pressing step is carried out at a second pressure P2 of 130 kg/cm² to about 170 kg/cm².

9. The method according to claim 8, wherein the first pressure P1 ranges from about 95 kg/cm² to about 105 kg/cm².

10. The method according to claim 8, wherein the second pressure P2 ranges from 145 kg/cm² to about 155 kg/cm².

11. The method according to claim 1, wherein the first time t1 ranges from about 30 seconds to about 90 seconds.

12. The method according to claim 1, wherein the second time t2 ranges from about 400 seconds to about 550 seconds.

* * * * *